No. 612,347. Patented Oct. 11, 1898.
A. H. KNIGHT.
PRUNING IMPLEMENT.
(Application filed Apr. 21, 1898.)
(No Model.)

Witnesses
Geo. E. Frech.
B. E. Seitz

Inventor
A. H. Knight,
by A. S. Pattison,
Attorney

UNITED STATES PATENT OFFICE.

ABRAHAM H. KNIGHT, OF CHAPEL, WEST VIRGINIA, ASSIGNOR OF ONE-THIRD TO HOMER M. MOYERS AND HENRY W. MOYERS, OF SHOCK, WEST VIRGINIA.

PRUNING IMPLEMENT.

SPECIFICATION forming part of Letters Patent No. 612,347, dated October 11, 1898.

Application filed April 21, 1898. Serial No. 678,425. (No model.)

*To all whom it may concern:*

Be it known that I, ABRAHAM H. KNIGHT, a citizen of the United States, residing at Chapel, in the county of Braxton and State of West Virginia, have invented new and useful Improvements in Pruning Implements, of which the following is a specification.

My invention relates to improvements in pruning implements, and it pertains to an implement adapted to cut either automatically by a downward pull of the handle or by a downward pull of a lever which is pivoted to the handle, all of which will be fully described hereinafter and particularly referred to in the claims.

Figure 1:
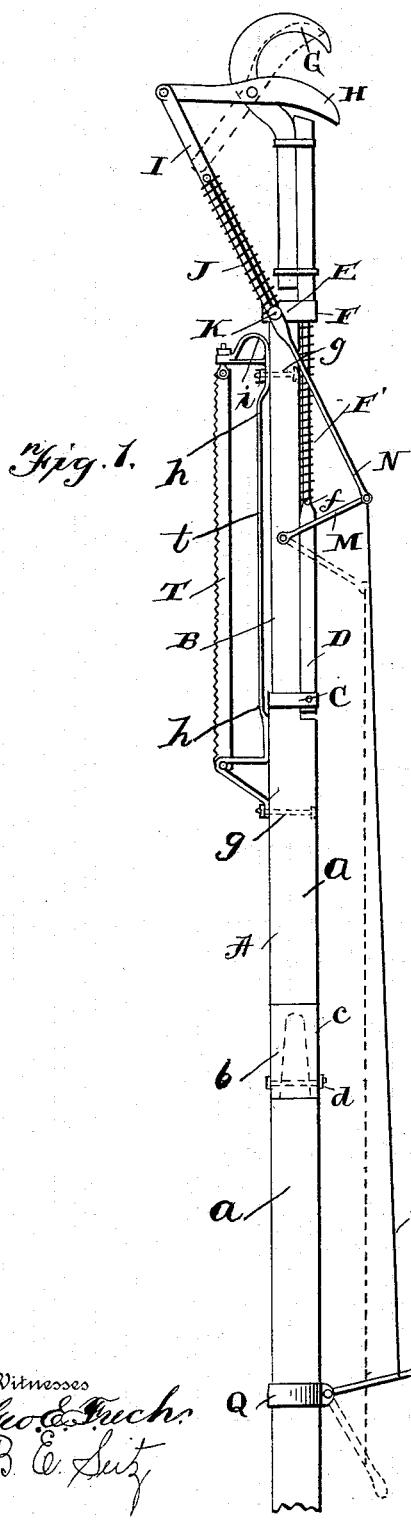
Figure 2:
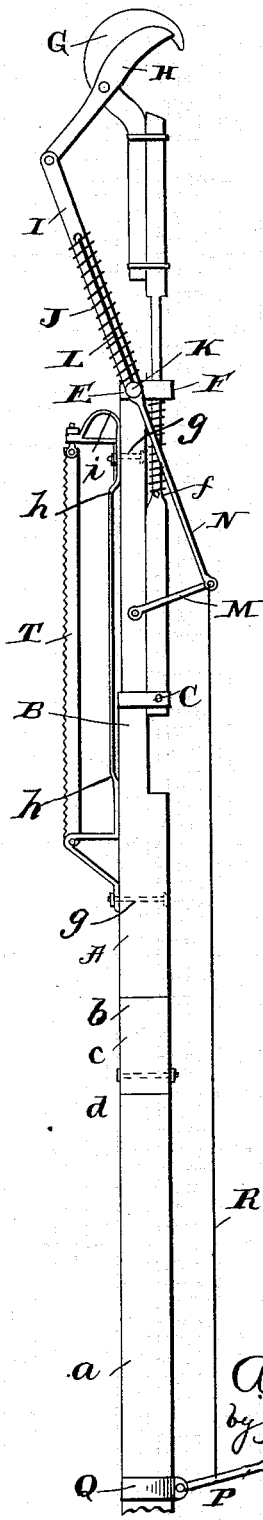

In the accompanying drawings, Figure 1 is a side elevation of a pruning implement embodying my invention shown with its cutting-jaws open in solid lines and closed in dotted lines through the medium of a lever pivoted to the handle. Fig. 2 is a similar view of the instrument, showing the jaws closed through a downward pull upon the handle itself, whereby the cutting operation is automatic.

In the accompanying drawings, A indicates a handle, which preferably consists of a series of sections $a$, jointed together at $b$, either in the manner here shown or in any other desired way, through the medium of a sleeve $c$ and bolts $d$. The upper end of the handle is reduced, as shown at B, and surrounding this reduced portion is a sleeve C, to which a rod D has its lower end attached. The upper end of the reduced portion B is provided with a sleeve E, having a projecting guide or sleeve F, through which the rod D passes, the rod D having a hooked blade G bolted to its upper end, as shown. A second blade H is intermediately pivoted to the blade G, with its cutting edge lying under the hooked cutting edge of the blade G. The opposite end of the blade H has a slotted rod I pivoted thereto, and surrounding this slotted rod or bar I is a spiral spring J. A pin K projects from the sleeve E through the slot L of the bar I and serves as a guide and stop for the movement of the rod I, and consequently the movement of the outer non-cutting end of the blade H. A forked arm M is pivoted to the reduced portion B of the handle, and to the outer free end of this forked arm M is connected a rod N, which has its opposite end connected with the lower end of the slotted rod or bar I. Pivoted to the handle at or near its lower end is an operating-lever P, its inner pivoted end being connected with a band Q, which is attached in any desired manner to the handle A. A rod R has its lower end connected in any suitable manner to this lever P, and the upper end of this rod R is connected also with the forked lever M. From this description it will be seen that a downward pull upon the lever P will cause the cutting end of the blade H to be carried up and coact with the hooked cutting edge of the blade G for severing the desired object.

The sleeve C moves freely up and down upon the reduced portion B, and the rod D has a spiral spring F' surrounding it, the upper end of the spiral spring abutting against the sleeve F, through which the rod D passes, and the lower end of the spring abutting against a projection or pin $f$. This spring serves to hold the rod D normally downward in the position shown, and the spring J around the rod I serves to hold it normally upward, as illustrated in full lines in Fig. 1.

The object of having the sleeve C movable upon the reduced portion B is to permit the rod D, carrying the blade G, to move upward when a downward pull is exerted thereon. Through the medium of this construction and also from the fact that the rod I is limited in its upward movement by the pin K the hooked blade G can be caught over a limb or other desired object, and a downward pull upon the handle A will cause the rod D to be drawn upward, and this upward pull will cause the cutting end of the blade H to move toward the hooked blade G owing to the fact that the rod I cannot be moved upward, and in this way an automatic cut is accomplished by a downward pull upon the handle A of the implement, as will be readily understood. The springs J and N serve to carry the parts of the implement to their normal position after either cutting operation.

Situated at the opposite side of the handle A from the cutting-blade is a saw T, preferably of the form here shown, and the saw-frame $t$ is attached to the handle A through the medium of bolts $g$, passing through opposite ends of the frame of the saw. It will be noted that the inner portion of the frame of the saw adjacent the reduced portion B is outside of and away from the adjacent side of the portion B, thus forming a space between the saw and the portion B to permit the free movement of the sleeve C thereon, as will be readily understood. This is accomplished by giving the ends of the saw-frame a lateral bend, as shown at $h$, which brings the lower end of the saw in a line with the larger portion of the handle A, as clearly shown, while the back of the saw is out of contact with the reduced portion B. The upper end of this saw is provided with a handle $i$, by means of which the saw can be used when detached from the implement.

By forming the handle A in sections it can be made of any desired length, which will be found very convenient.

By means of an implement as above described I am enabled to cut either by a pull upon a lever pivoted to the handle or by a downward pull upon the implement itself, which will automatically cause the closing of the blade and therefore a cutting of the object over which the hooked blade is caught.

Having thus described my invention, what I claim, and desire to secure by Letters Patent, is—

1. A pruning implement comprising a handle, a vertically-movable rod upon the handle, a blade connected with the upper end of the handle and having a laterally-projecting cutting edge, a blade intermediately pivoted to said vertically-movable blade and having a cutting edge under the lateral cutting edge thereof, a rod pivoted to the opposite end of the intermediately-pivoted blade and having a longitudinal slot, a pin projecting from the upper end of the handle through the said slot for limiting its upward movement, whereby a cutting action is produced by a downward pull upon the handle, the parts combined to operate as described.

2. A pruning implement comprising a handle, a rod vertically movable upon the said handle, one end of the rod projecting beyond the handle and carrying a blade with a laterally-projecting cutting edge, a second blade intermediately pivoted to the first blade with a cutting edge under the lateral projecting portion, a rod connected to the opposite end of the intermediately-pivoted blade, a pin or projection extending from the handle and limiting the upward movement of the said rod, and a spring serving to hold the rod normally upward, whereby a cutting action is produced by a downward pull upon the handle, substantially as described.

3. A pruning implement comprising a handle, a rod having its lower end provided with a sleeve surrounding the handle, the upper end of the handle having a guideway through which the upper end of the rod passes, a knife secured to the upper end of the rod and having a laterally-projecting cutting edge or blade, an intermediately-pivoted blade with a cutting portion below the lateral cutting edge of said blade, an operating connection with the opposite end of the intermediately-pivoted blade, a spring surrounding said rod and holding it normally downward, a pin for the connection of the intermediately-pivoted blade, whereby a cutting action is produced by a downward pull upon the handle, substantially as described.

In testimony whereof I have hereunto set my hand in the presence of two subscribing witnesses.

ABRAHAM H. KNIGHT.

Witnesses:
ORA M. BENDER,
EVA J. BENDER.